United States Patent Office 3,432,747
Patented Mar. 11, 1969

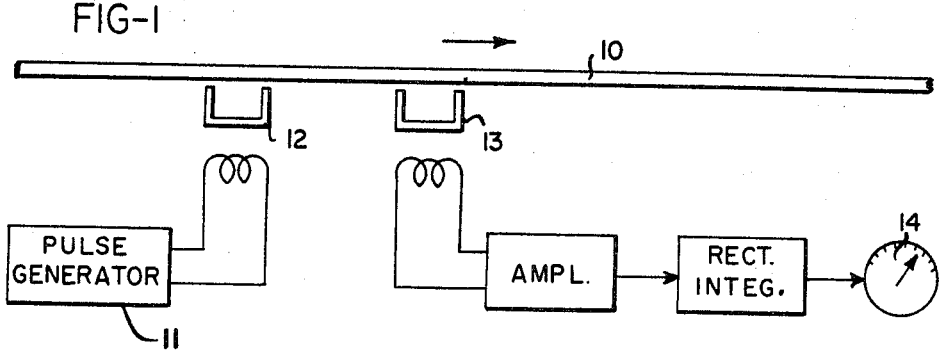
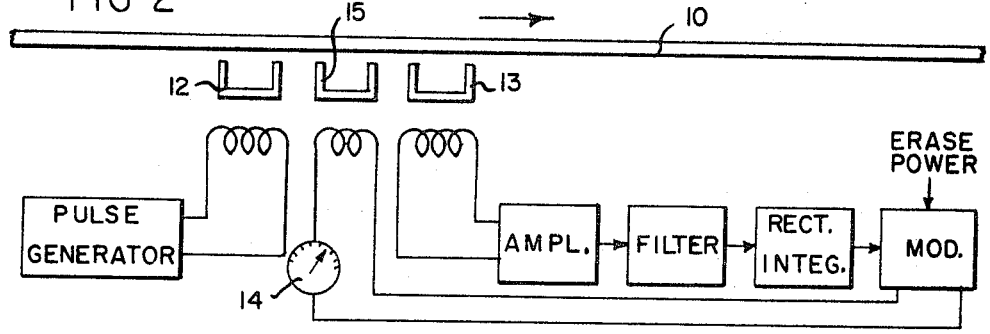
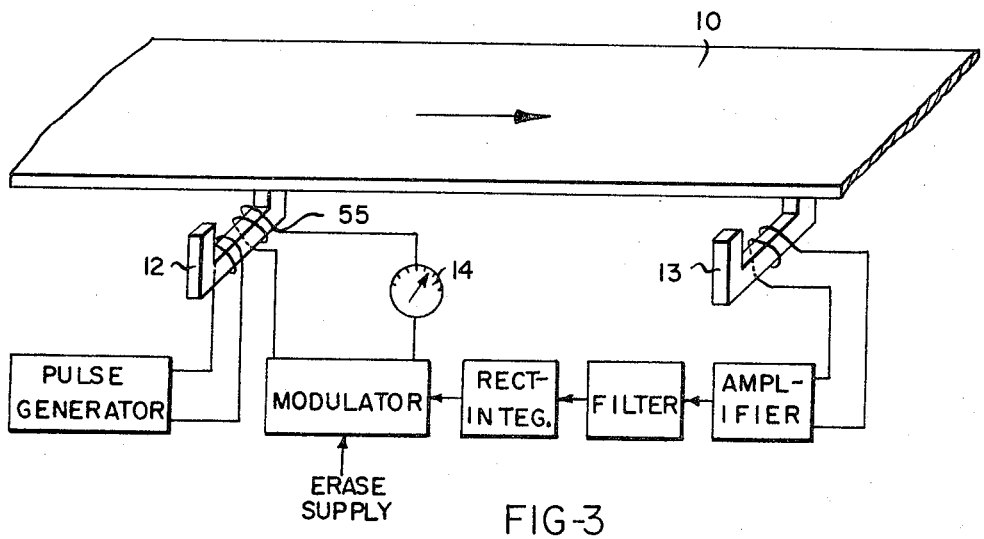

---

3,432,747
SPOT RECORDING AND PICKUP METHODS AND APPARATUS FOR THE DETERMINATION OF HARDNESS OF RELATIVELY MOVING MAGNETIC MATERIAL WITHOUT CONTACTING THE SAME
George F. Quittner, Cleveland Heights, Ohio, assignor to API Instruments Company, Chesterland, Ohio, a corporation of Ohio
Continuation-in-part of application Ser. No. 235,984, Nov. 7, 1962. This application Jan. 23, 1967, Ser. No. 610,833
U.S. Cl. 324—34          6 Claims
Int. Cl. G01r 33/12

---

ABSTRACT OF THE DISCLOSURE

A non-contact magnetic, hence physical, hardness gage having a pulsed recording head spaced as much as $\frac{1}{32}$ to $1''$ from relatively moving steel strip. Magnetic spots thus placed on the strip are later picked up by a likewise spaced-from-strip pickup transducer whose output signal is amplified, integrated and read out as a measure of sample hardness.

---

Related application

This application is a continuation-in-part of my copending application Ser. No. 235,984, filed Nov. 7, 1962, assigned to the assignee of the present invention, and now abandoned.

Brief summary

In general, my invention consists of selecting two locations near the path of motion of a sheet of magnetic material being processed, inserting at a first location arrangements for repetitively applying discrete magnetizing field impulses to the material, inserting at a second position arrangements for sensing the presence of magnetized spots on the material due to retention by the material of the influence of magnetizing impulses applied at the first location, and then reading the strength of the magnetized spots on the sheet as it passes the second location, thus measuring magnetic retentivity as a means of determining physical hardness. In a preferred embodiment the output signal is fed back to provide over-all measuring system negative feedback.

Description of drawing views

Figure 4:
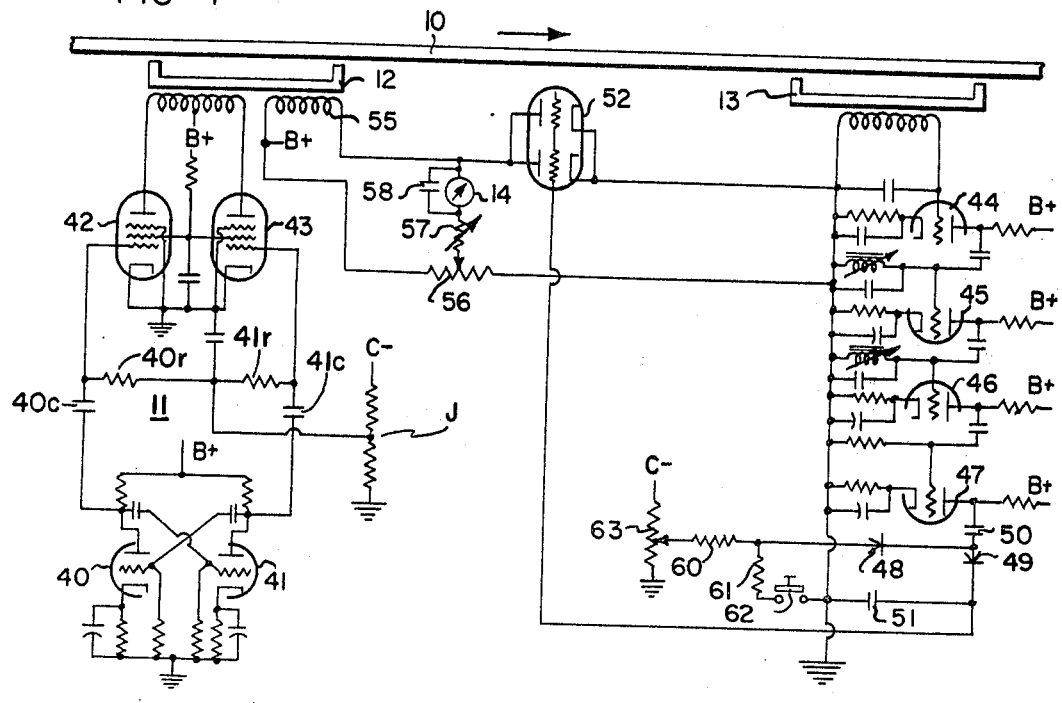
Figure 6:
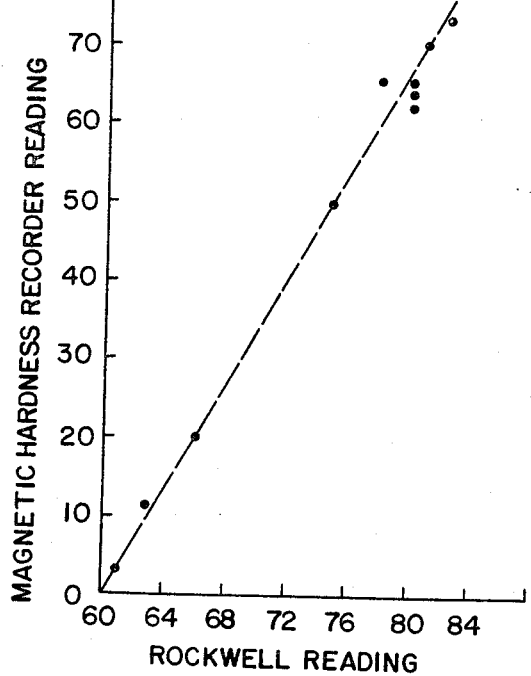
Figure 5:
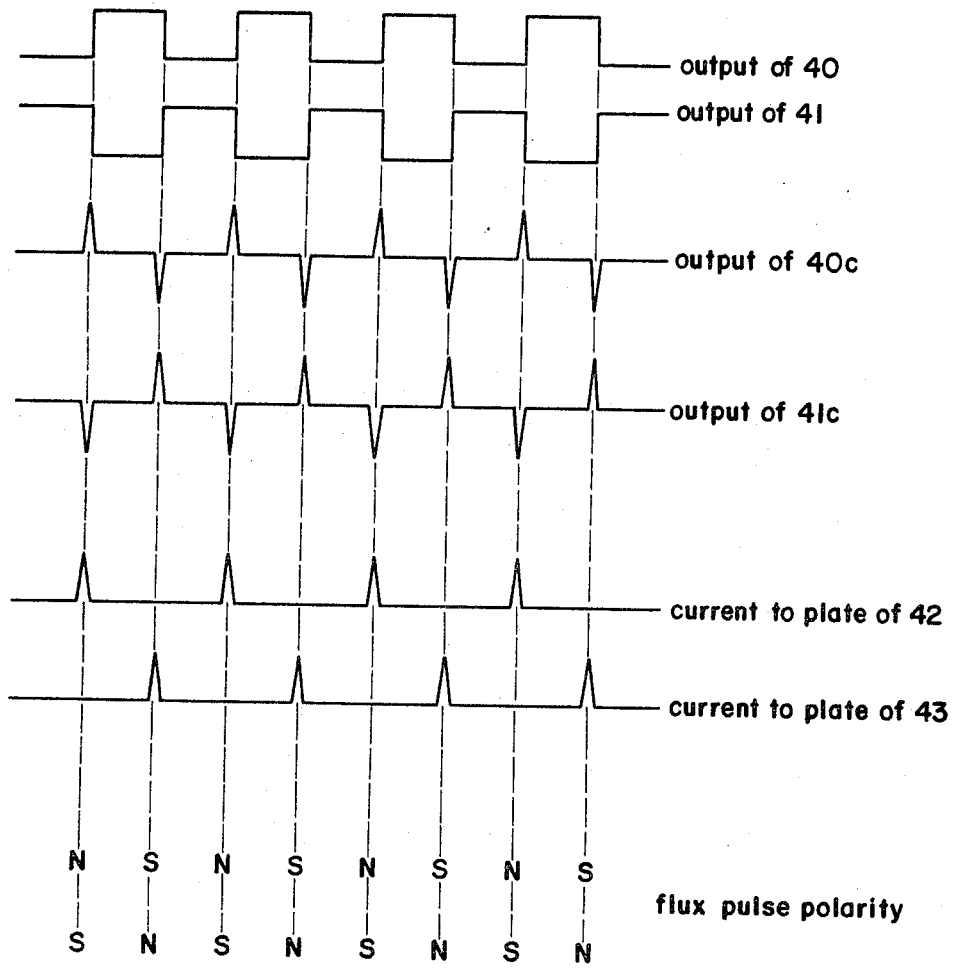

In the accompanying drawings:
FIG. 1 is a schematic diagram of a simplified arrangement;
FIG. 2 is a similar diagram but showing a preferred embodiment;
FIG. 3 shows a further preference;
FIG. 4 is one of many practical possible wiring diagrams, adapted for the practice of my invention;
FIG. 5 shows signal time relations and signal shapes in the pulse generator and recording head section of the circuitry of FIG. 4, and
FIG. 6 is a graph showing the general relationship between Rockwell physical hardness test results and readings from my apparatus, for a steel strip which has been plant tested.

Background

It has long been observed that there is a general positive correlation between the physical hardness of a magnetic material like steel and its "magnetic hardness" or more accurately, its "magnetic retentivity." If a piece of steel having low magnetic retentivity is exposed to a magnetic field and then removed from it, very little evidence of the former magnetization will be retained; on the other hand, if the piece were magnetically hard, relatively much more magnetization would be retained.

When such materials are "cold worked" as by cold rolling and/or "tempering" (a process wherein the material is cold rolled and stretched only relatively slightly) they become physically harder, and, as our experiments have proved, magnetically harder. For many purposes such cold worked material must be made physically softer before either further cold work or final product shaping may be performed, and this is done by "annealing." Annealing in general consists of carefully heating the material to above a suitable temperature which is characteristic of that material, holding it for a suitable length of time at that temperature, and cooling it to room temperature again at a controlled rate. Annealing not only makes the material physically soft again, but it has been found that this also makes it again "magnetically soft," or relatively non-retentive.

Physical hardness is customarily measured by such standard methods as the Brinell or Rockwell tests. In these and other such techniques a standardized deforming force and shape is applied to a sample of the material, and the resistance of the material to such deformation is measured by observing the permanent deformation. Since the hardness of magnetic materials is technologically in extremely important property, many such tests are run both by suppliers and purchasers, and product specifications often include limitations on the variation of this property.

Various methods have been proposed and occasionally used to overcome the difficulties associated with these widely accepted, destructive tests which require process stoppage, sample removal, and repetition to provide suitably representative sampling. However, no really practical, non-contact method of determining hardness at high speeds has been available.

It is an object of this invention to measure magnetic hardness of suitable materials by a non-destructive, non-contact, continuously informative technique which is relatively independent of sample speed and which is relatively useful, e.g., to prepare continuous records, or to automatically control processes (such as cold-working and annealing) to modify hardness.

Detailed description

Referring to FIG. 1, this general arrangement shows a continuously moving strip, strand or other elongated shape of magnetic sample material 10. An electrical pulse generator 11 supplies pulses to a recording head 12 fixed at a first location and at least $\frac{1}{32}''$ from the material 10. At a second location (farther along the path of travel of magnetic material 10) a pickup transducer head 13 is mounted normally also at least $\frac{1}{32}''$ from sample. The electrical signals produced by the head 13 are amplified (see FIG. 4, 44, etc.), rectified (49, etc.) and integrated (50 etc.) and their energy content read on a meter 14. The meter 14, being an electromechanical device, will operate slower than the pulse repetition rate and, with the integrator provided, the meter reads only time averaged values which are generally indicative of hardness.

While the basic scheme of FIG. 1 can produce useable results, there are some weaknesses and disadvantages to it. For example, the magnetic material 10 will in practice have some vibration toward and away from the heads 12 and 13 as well as sample non-flatness, and because the material is partly magnetized "noise" will be transduced and amplified along with desired retentivity signals to produce readings at meter 14 which are partly dependent on the non-constant quantity of this noise. A further and even more serious disadvantage is that magnetic materials vary not only in retentivity (that is, vary in the percentage retained of the originally induced magnetic field) but vary in the energy required to produce any retention at all.

The scheme of FIG. 2 contains two improvements over that of FIG. 1. First, the signals picked up at the second location 13 are filtered to remove all those not at the pulsed frequency. This eliminates a very large fraction of the noise generated by vibration of the magnetic material, and in most installations makes the noise insignificant compared with the signal desired.

Conventionally the equipment has an erase-clean head (not shown) located before the recording head 12 and for removing any residual magnetism that the sample material might have before it enters the recording head. An improvement of FIG. 2 over FIG. 1 involves the use of another erase head 15 at a location which is between those of the recording head 12 and the pickup head 13, along the path of magnetic material motion. The erase head 15 may be powered by either relatively high frequency alternating current or by direct current (both methods being well known in the field of magnetic information signal recording) but in either case the degree of such erasing is modulated by the integrated picked-up signal so that as that signal becomes larger, the erase field becomes stronger, tending to restore the picked-up signal to the size it had before it increased; this, therefore, is a "negative feedback" arrangement. The signal of interest may conveniently be read, here, by measuring the amount of this feedback signal, because what I really do is compare readings, comparing a reading at one point of time, thus for one portion of moving sample, with that at another, and so on. Of course the "negative" (i.e., subtractive) feedback (as in AVC in a TV set) is never planned to be 100% effective as a cancellation, or there would be no spot signal at all. In FIGS. 2–4, for example, less than 100% may be achieved merely by having a sufficiently small number of erase coil turns.

It can be seen that the negative feedback loop has the following effect; if, for example, the pickup head 13 inadvertently becomes further from magnetic material 10, so that the picked-up signals become weaker, the meter 14 reading will decrease, but by such decreasing the partial erase signal is weakened, tending to restore the readings toward their prior value. If, on the other hand, the retained signals before the erase and pickup heads become stronger than previously, more erase current will flow, to reduce the picked-up signal toward its prior level, causing the desired change in reading. However, changes in distance between the record head 12 and magnetic material 10 are not compensated at all by this scheme.

In FIG. 3, my preferred embodiment, the filter of FIG. 2 is utilized, and in addition the feedback loop idea is extended to include the recording head 12. Here the erase signal is algebraically added to the record signal in such a way as to modulate the recorded signal strength. This aids in reducing the effect of varying head to material distance effects (e.g., that due to roll wear) in two ways: (1) the number of locations at which spacing changes may occur is reduced from three to two; (2) all head spacings are now (to the degree possible) compensated, rather than as in FIG. 2, two being compensated and one uncompensated. In the arrangement of FIG. 3, as the record head 12 moves, for example away from material 10, because this includes the erase winding 55 (no longer at a separate location as in FIG. 2) the previously explained feedback effects tend to compensate. Further as the head moves away, the erase action decreases precisely in the same degree as the record field strength, so that part of the variation is also compensated.

It doesn't really matter whether output is taken to an erase head (15 in FIG. 2), or to oppose original excitation on recording head (12 in FIG. 3), or merely into the original electrical circuitry (before, in, or after the pulse generator). The same inventive concept is involved.

Convincing is the fact that the various systems work, and are working in plural steel mill installations.

It should be noted that, when measurements are made by the method described, there is a tremendous change in magnetic properties for a given change in hardness. For example, for a 10 point rise of Rockwell 30T hardness in tin plate, one can expect approximately 100% increase in magnetic signal. For this reason there is signal gain (in the spots) to throw away, and it is a good design compromise to throw away part of the signal gain (in the spots on the sample) in order to produce all the well known advantages of negative feedback, such as linearizing any non-linear effect in the amplifier and feedback loop, compensating for tube or other component aging, reducing effect of temperature change, reducing average pulsing power in some designs, etc.

Referring to FIG. 4, the magnetic material 10 to be tested passes first the recording head 12, and then the pickup head 13. In the following circuit description only the most salient circuit points will be discussed, to avoid discussion redundant to those skilled in the electronic art.

The pulse generator 11 includes a conventional multibrator having vacuum tube triode halves 40 and 41 feeding square waves to coupling capacitors 40c, 41c at a selected constant frequency. These capacitors (40c, 41c) and the accompanying resistors 40r and 41r, are selected to differentiate the square waves produced by the multivibrator. Bias voltage is provided at junction J to maintain two output tubes 42 and 43 normally cut off, a condition generally referred to as "Class C." Therefore, only positive going signals from differentiating capacitors 40c and 41c can cause current to flow in tubes 42 and 43, and thus in the push-pull winding of the recording head. For most conditions a relatively low frequency is advantageous, such as 2 to 40 pulses per second, to permit readings to be made at low material processing velocities with broad-gap recording heads and industrially practical head-to-sheet spacing such as ½" on up to 1".

FIG. 5 shows signal time relations and signal shapes for signals in the pulse generator and recording head section of FIG. 4. The top pair of wave forms show the push-pull time relations and square wave shapes at the outputs of tubes 40, 41. The next pair of representations shows the push-pull pulse wave form which results from the differentiating action (of 40c, 41c, 40r, 41r). The third pair of characterizations represents current passing through the head windings. The bottom portion of FIG. 6 shows the way the polarity of the sequential flux pulses reverses (with the embodiment of FIG. 4) and the time relation of such pulses to the wave forms shown above.

Referring back to FIG. 4, signal picked up by the head 13 is passed through conventional, narrow band amplifiers 44 and 45 to adequately remove both vibrational noise and any picked up hum, and then through voltage amplifiers 46 and 47 to obtain adequate control voltage. The amplified and filtered signals are rectified by diodes 48 and 49 and filtered and integrated by capacitors 50 and 51 and applied to the grids of an erase current control tube 52. The control tube is connected as a series variable resistor between the erase winding 55 of the record head 12 and ground.

Since, with the degenerative action of the negative feedback connection, the spread of erase current values for differing magnetic hardness is small relative to the total erase current flowing means for "suppressing the zero" of the meter are desirable. One convenient method of doing this is to utilize a bridge circuit as shown in FIG. 4. While erase winding 55 and tube 52 constitute one half of the bridge circuit, an adjustably tapped resistor 56 constitutes the other, reference half. Meter 14 reads current flow, resulting from unbalance of the bridge, and may be provided with a sensitivity adjustment resistor 57 and an averaging (damping) capacitor 58.

With the bridge circuit the meter zero may be suppressed as far as desired by selection of a suitable tap position on balance resistor 56. To facilitate meter reading standardization, it is convenient to be able to reproducibly produce momentary flow of an arbitrarily selected standard value of erase current, and resistors 60 and 61, in conjunction with a normally open push button switch 62, reduce the bias of control tube 52 from the nearly cut-off value normally supplied via an adjustable bias resistor 63 to the desired value for such checking.

FIG. 6 illustrates typical results obtainable with the equipment, in plant service. Pen recordings were made on a chart recorder (corresponding to 14). A measuring head (an assembly of erase, recording and playback heads) was mounted approximately ¼" above the moving sample strip which was passing over a rubber covered bridle roll at the exit portion of an annealing furnace in a continuous tin-plate (approx. .010" gage) annealing line. The heat in the furnace was deliberately reduced at the beginning of the test, resulting in a gradual rise in hardness of the sample material during the period of the test. In order to assure accurate sampling, for each point of data, now shown in FIG. 6, a chalk mark was made on the strip as it passed the recording head, and simultaneously an identifying mark was made on the recorder chart paper. When the marked portion of the strip reached the take-up end of the annealing line, a sample was cut out and tested with a standard Rockwell 30T mechanical hardness tester.

It can be seen from FIG. 6 that the correlation between Rockwell hardness and readings is quite good.

General experience in the use of the invention has shown that as the thickness of the strip increases, for a given Rockwell level of hardness the magnetic readings decrease somewhat. However, this effect is small enough that normal thickness variations within a single coil will not significantly affect the magnetic reading. For most grades of steel processed in a given plant the correlation between Rockwell and magnetic hardness is constant enough to permit estimation of Rockwell test equivalent values from magnetic hardness readings. When high accuracy is required, gage effects and grade effects can be compensated either automatically or manually, to obtain a final signal useful either to vary a visual read-out, if that is all that is desired, or to continuously control metallurgical processes which adjust the hardness of material which is being processed.

As is well known in electronics lexicography, pulses, though recurrent, do not exhibit any cyclic (e.g., sinusoidal or square) wave shape. They are, rather, characterized as being isolated surges, so that the resultant wave (if it can be called that) has a substantial dwell time at zero (or some other constant value representative of decay). Thus a pulse is a function whose time is short relative to a substantial amount of dwell time at the base line. See: "Dictionary of Electronic Terms" sixth ed. (published by Allied Radio, Chicago, Ill.); "Reference Data for Radio Engineers" 4th ed., p. 385 (publ. by International Tel. & Tel. Corp., New York, N.Y.); "Instruments & Control Systems" for November 1966, pp. 109–111 (of article by John C. Hubbs on pulse definitions); "Encyclopedic Dictionary of Electronics and Nuclear Engineering," p. 983 (Prentice Hall, 1959). It is in this dictionary sense that the present specification and claims call for pulses. Such pulses are inherently of brief duration compared to their repetition period. The use of short pulses separated by significant time seems essential to the practical application of this invention. With a fixed frequency of, for example, 20 p.p.s. and a strip speed, for example, of 1800 f.p.m. (30 f.p.s.) the distance between magnetic spot centers on the strip will be approximately 1.5 ft. If, with this same spotting frequency, strip speed drops to 180 f.p.m. (3 f.p.s.) the spot centers will be only 0.15 ft. apart. Because of the gap required to make a useful instrument each spot actually extends approximately 1" along the strip so that with only 1.8" spacing between centers the result is that the external field which must be sensed by the pickup head is reduced as compared with the strength sensible at the higher speed. It is thus clear that unless the short duration magnetic pulses are separated by relatively long periods of time, producing corresponding spatial separations between spots, the instrument would be excessively sensitive to changes in strip speed. But most industrial process lines are designed for speed variations on the order of 5:1 to 10:1. Therefore the pulses are of brief duration compared to their period.

The present invention is distinguishable from past tape recorder art, in the following respects:

(a) The magnetic record according to the invention consists of constant repetition rate spots formed by pulses of very short duration on a recording medium which inherently varies in speed in an un-predetermined manner;

(b) To practice the invention it is necessary that a substantial air gap exist between the medium and the head, and this dictates that each head be shaped to minimize flux leakage between its pole pieces. Therefore, the gap between pole portions of each head is large, U cores being preferred;

(c) Signal is always at constant frequency, so preferable narrow band filtering can be used to pass only one frequency;

(d) Feedback in the sense described is preferable and possible, although it would be impossible in a conventional tape recorder where pickup occurs at a different time than recording.

There is thus provided devices and methods of the class described capable of meeting the objects above set forth and having advantages of sample material non-defacement and processing speed and economy.

While I have illustrated and described particular embodiments, various modifications (e.g., the use of other flux inserting, erasing or sensing means, such as magneto resistive, core saturation or Hall effect transducers, or the use of separate integrators for yielding signal and feedback with different time constants) may be made without departing from the true spirit and scope of the invention which I intend to have defined only by the appended claims taken with all reasonable equivalents.

I claim:

1. A method of determining magnetic and hence physical hardness of manifold portions of an extended length, relatively moving, magnetic material sample, which may vary in speed of movement, said method being characterized by:
applying to the moving sample and from a relatively stationary source constant repetition rate flux pulses inherently of brief duration compared to their repetition period, for linking such pulses with individually separate portions of the sample and for providing magnetized spot signals thereon, using a pickup transducer spaced along the direction of movement of sample from said source, for picking up signals from the spots provided on the magnetic material, amplifying and integrating the resultant signal from the transducer, for providing an analog signal which can be read by an amplitude read-out device, and energizing, from the amplified and integrated signal, an amplitude read-out device for comparing variations of the thus derived amplified and integrated signal for variant portions of said sample.

2. The method of claim 1 further characterized by the intermediate steps of supplying to said source of constant repetition rate flux pulses an alternating excitation for providing magnetized spot signals having polarity alternately arranged on the magnetic material, and rectifying the signal intermediate the amplifier and the read-out device.

3. The method of claim 1 further characterized by the step of feeding back the transducer signal as amplified and integrated to weaken spot signals in proportion to integrated transducer signal values.

4. The method of claim 1 further characterized by filtering the signal from the transducer and before the read-out for removing signals not at the frequency of the flux pulses.

5. The method of claim 1 further characterized in that the flux pulse source and also the pickup transducer are spaced at least 1/32" from the magnetic material.

6. Testing apparatus for determining relative magnetic hence relatively physical hardness of relatively moving magnetizable sample material, said apparatus comprising:
   a multivibrator,
   magnetic flux pulse source means including a pair of amplifiers triggered differentially with respect to time by said multivibrator, a pair of coils respectively fed in a push-pull sense from said amplifiers, and a U-shape core electromagnetically associated with said coils and located adjacent while spaced from said moving material, for subjecting said material to flux pulses and thereby recording alternately arranged magnetized spot signals thereupon,
   a non-sample contacting transducer means located further along the movement path of said material than is said magnetic flux pulse source means and for transducing magnetized spot signals remaining in said material to electrical signals,
   a means connected to said transducer and for amplifying, rectifying and integrating electrical signals therefrom,
   means connected to be energized from said amplifying, rectifying and integrating means and for diminishing the intensity of the magnetized spot signals proportional to the amplified, rectified and integrated transducer signals,
   a bridge circuit in which one arm of the bridge is formed by said means for diminishing, another arm of the bridge is a current controlling electronic device, and two other arms of the bridge are portions of an adjustably tapped resistor,
   and a read-out means connected through the resistor adjustable tap and through another point on said bridge and for continuously providing an indication of relative magnetic and thus physical hardness of the moving sample material.

References Cited
UNITED STATES PATENTS 2,211,017  8/1940  Leifer et al. _____ 324—34 X
2,922,106  1/1960  Oates et al. _____ 324—34

RUDOLPH V. POLINEC, *Primary Examiner.*

A. E. SMITH, *Assistant Examiner.*

U.S. Cl. X.R.

179—100.2